United States Patent [19]

Kim et al.

[11] Patent Number: 5,241,579
[45] Date of Patent: Aug. 31, 1993

[54] STATUS MANAGEMENT METHOD OF A SIGNALLING SERVICE DEVICE IN AN ELECTRIC SWITCHING SYSTEM

[75] Inventors: Dae S. Kim, Jung-Ku Daejeon; Byung H. Yae, Dong-Ku Daejeon; Chan H. Yoo, Yuseong-Ku Daejeon; Hyoung J. Park, Dong-Ku Daejeon, all of Rep. of Korea

[73] Assignee: Korea Telecommunication Authority Electronics and Telecommunications Research Institute, Rep. of Korea

[21] Appl. No.: 834,141

[22] Filed: Feb. 10, 1992

[30] Foreign Application Priority Data

Feb. 12, 1991 [KR] Rep. of Korea .................. 1991-2379

[51] Int. Cl.⁵ ............................................. H04M 3/10
[52] U.S. Cl. ........................................ 379/10; 379/33
[58] Field of Search ................. 379/9, 2, 27, 33, 31, 379/23, 10, 32

[56] References Cited

U.S. PATENT DOCUMENTS 3,626,383 12/1971 Oswald et al. ...................... 379/10

Primary Examiner—Stafford Schreyer
Attorney, Agent, or Firm—Blakely, Sokoloff, Taylor & Zafman

[57] ABSTRACT

A status management method of this invention comprises: a first step of receiving a status alteration information of speech path device, analyzing each alteration status, and altering a count for each status; a second step of calculating a service reference value of each signalling service device as based on the number of subscriber lines for normal service in case that a status alteration device is subscriber line, and reporting a fault segregating limitation value of each signalling service device in case that said service reference value is altered; and a third step of analyzing a service status of each signalling service device according to said service reference value, and ending the status management on outputting a software alarm according to an analysis result of said service status.

3 Claims, 6 Drawing Sheets

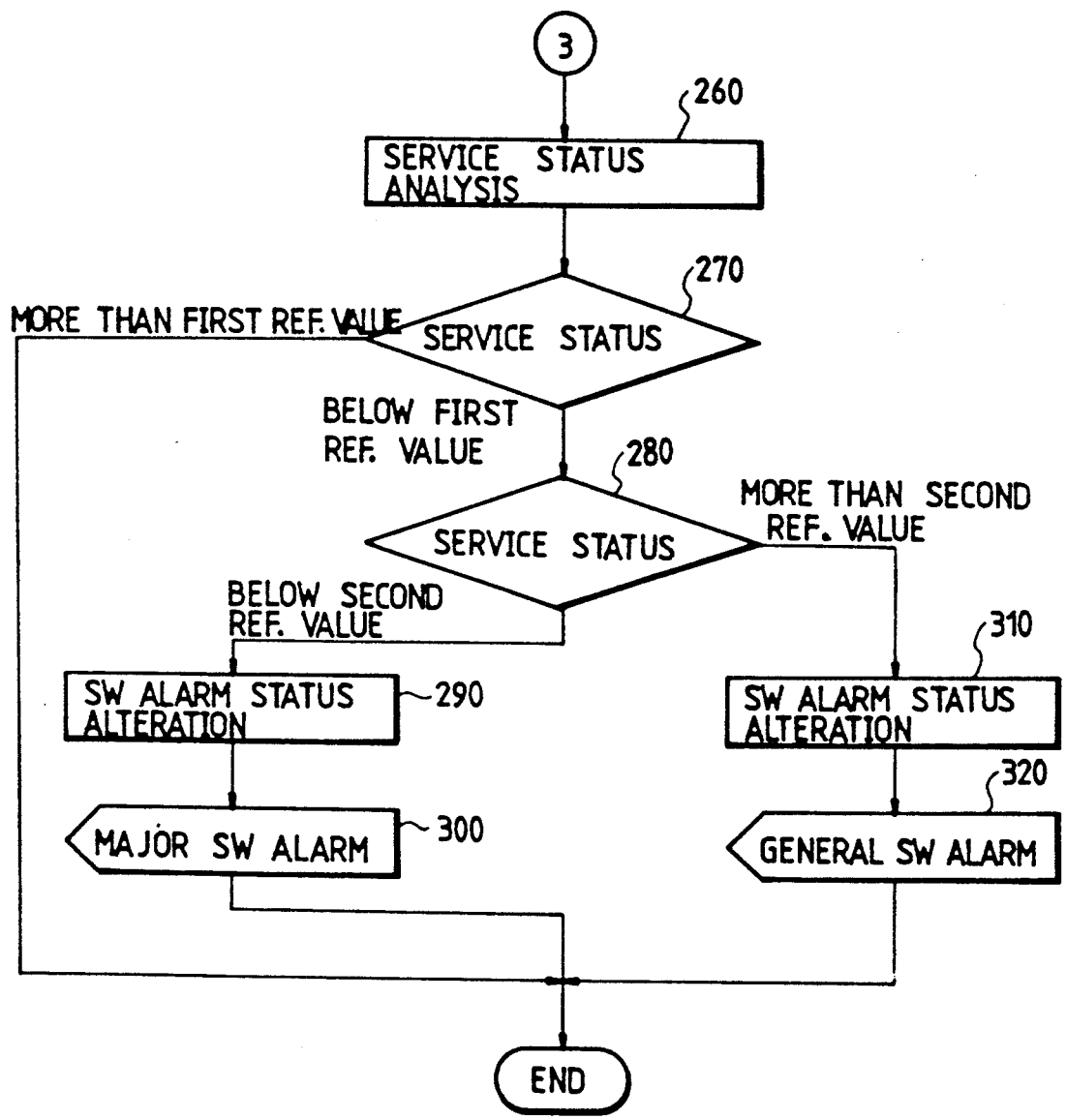

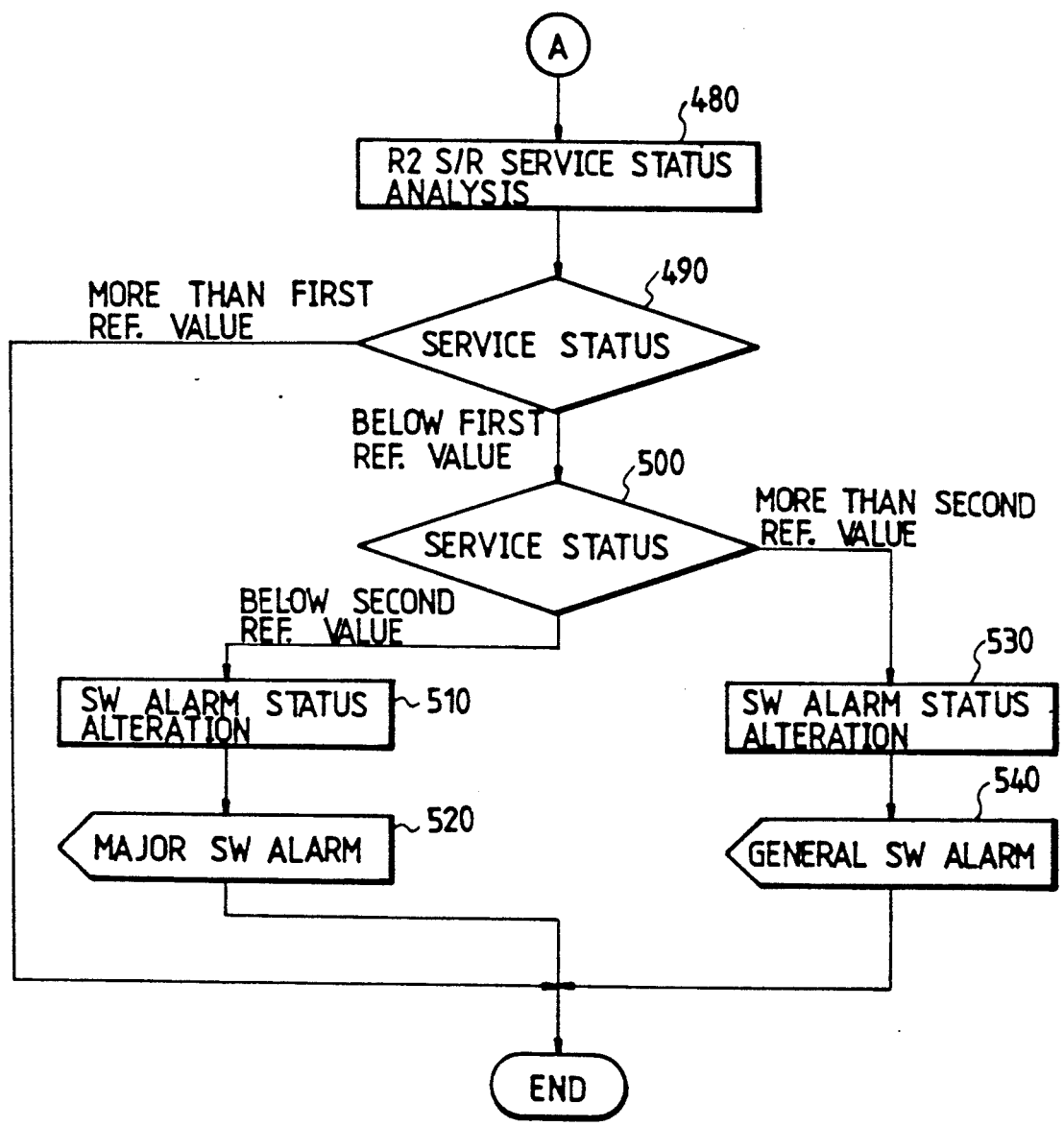

STATUS MANAGEMENT METHOD OF A SIGNALLING SERVICE DEVICE IN AN ELECTRIC SWITCHING SYSTEM

BACKGROUND OF THE INVENTION

The present invention relates to a status management method of a signalling service device in an electric switching system.

The conventional status management method of the signalling service device was made up of the steps of altering channel number for each status according to the alteration status generated during operation, calculating the number channels segregated from service, and outputting software alarm message together with status information of channel which the status alteration was generated in case that the result compared to a predetermined ratio of the number of all mounted channels was more than a predetermined value. This, however, caused deterioration in service quality since effective status management was difficult.

SUMMARY OF THE INVENTION

It is an object to provide a status management method of a signalling service device in an electric switching system, for performing an effective status management according to status alteration of subscriber line and trunk mount and of the signalling service device.

In an electric switching system comprising a plurality of processors performing operation and maintenance, signalling service interface and control functions for performing status management of a plurality of signaling service devices, a status management method comprises: a first step of receiving a status alteration information of speech path device, analyzing each alteration status, and altering a count for each status; a second step of calculating a service reference value of each signalling service device as based on the number of subscriber lines for normal service in case that a status alteration device is subscriber line, and reporting a fault segregating limitation value of each signalling service device in case that said service reference value is altered; and a third step or analyzing a service status of each signalling service device according to said service reference value, and ending the status management on outputting a software alarm according to an analysis result of said service status.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
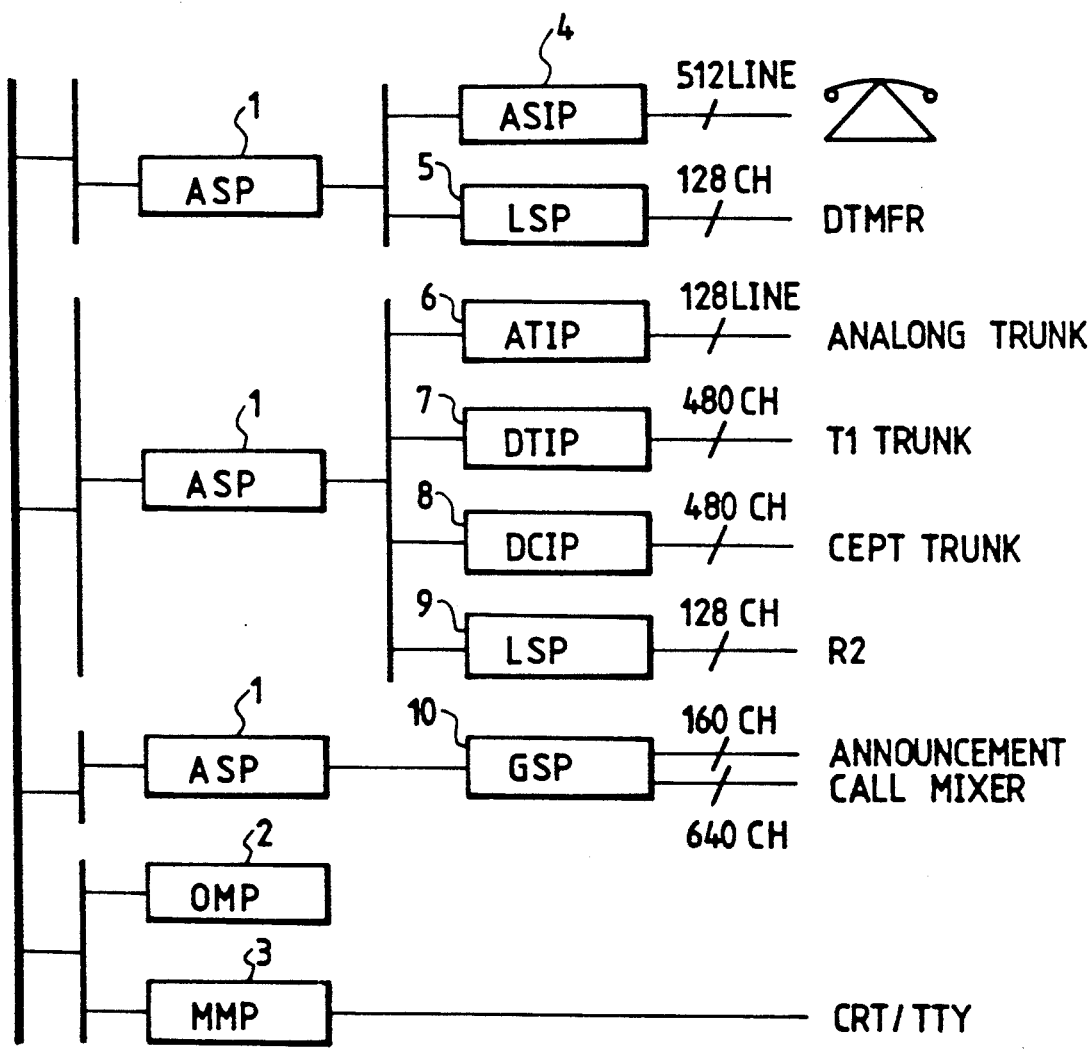
FIG. 1 is a block diagram of a hardware system which this invention is applied.

FIG 1. is a construction diagram of a hardware system to which this invention is applied, and in FIG. 1, the reference number 1 shows and ASP (Access Switching Processor), 2 and OMP (Operation & Maintenance Processor), 3 a MMP (Man Machine Processor), 4 and ASIP (Analog Subscriber Interface Processor), 5 and 9 a LSP (Local Service Processor), 6 and ATIP (Analog Trunk Interface Processor), 7 a DTIP (Digital T1 Trunk Interface Processor), 8 a DCIP (Digital CEPT Trunk Interface Processor), 10 a GSP (Grobal Service Processor).

The hardware system to which this invention is applied comprises the MMP 3 which performs an input/output control for interface with an operator , the OMP 2 which performs the overall operation and maintenance of the system, determines the service quality and controls the system operation, the ASP 1 which controls subscriber, trunk and signalling equipment, the ASIP 4 which performs an interface with the analog subscriber, the LSP's 5 and 9 which performs DTMF (Dual Tone Multi-Frequency) and R2 signal function, the ATIP 6 which performs an interface with an analog trunk, the DTIP/DCIP 7 and 8 which performs an interface with each T1 and CEPT trunk, and the GSP 10 which controls an announcement and a call mixer.

Figure 2:
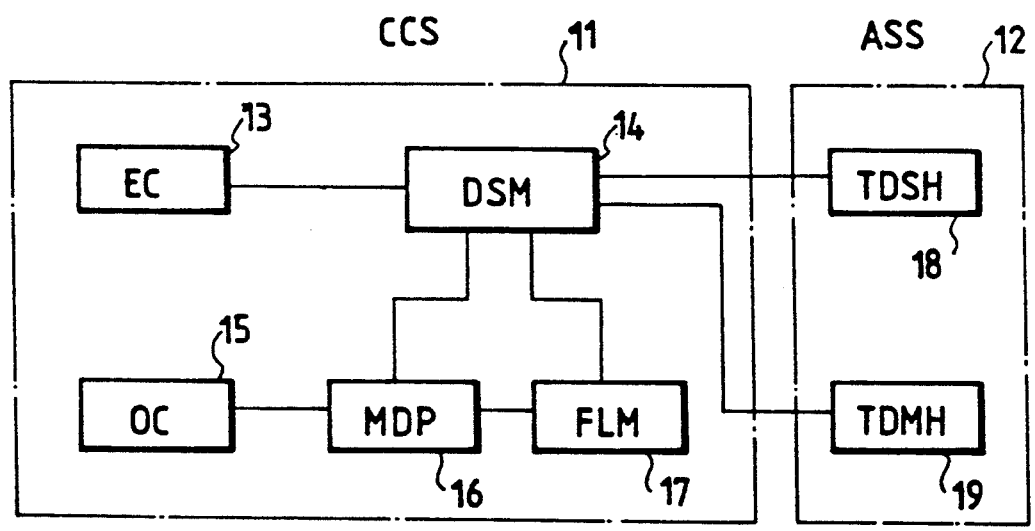
FIG. 2 is a construction diagram of software block of this invention.

FIG. 2 is a block diagram of a software of the invention, and in FIG. 2, the reference number 11 shows a CCS (Central Control subsystem), 12 an ASS Access Switching Subsystem). 13 an EC) Execution Control), 14 a DSM (Device Status Management), 15 an OC (Output Control), 16 a MDP (maintenance Data Processing), 17 a FLM (Fault Management), 18 a TDSH (Telephony Device Supervision Handling), and 19 a TDMH (Telephony Device Maintenance Handling).

As shown in FIG. 2, the software block comprises the DSM 14 which manages the device status, the EC 13 which executes the operator's request command, the OC 15 which controls the system output message, the MDP 16, the FLM 17 which receives and classifies the fault information and manages the hardware alarm, the TDSH 18 which supervises the speech path device status, and the TDMH 19 which maintains the status alteration of the speech path device.

Figure 3:
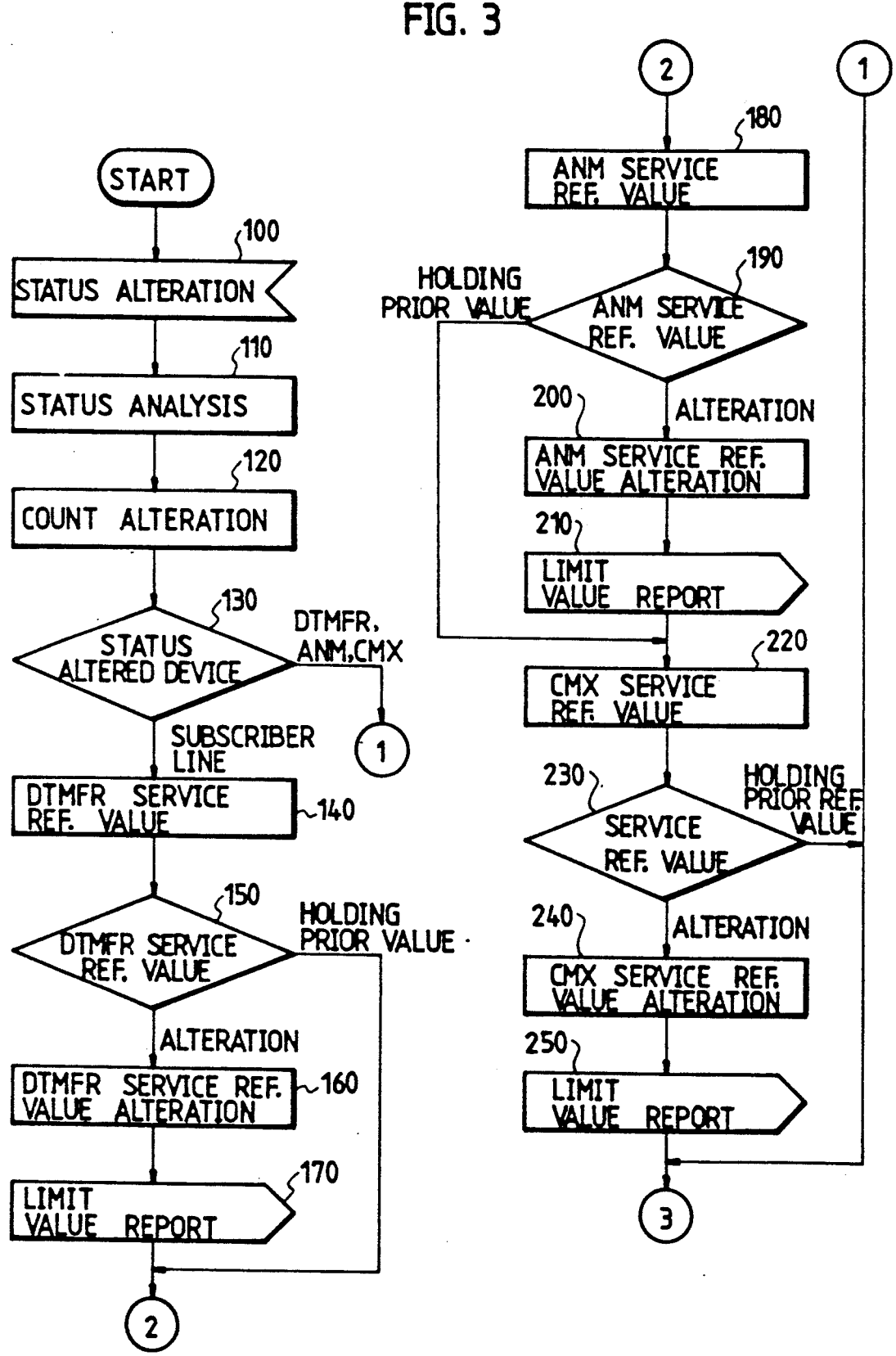
FIG. 3 is a flow diagram of one embodiment of a status management method.

FIG. 3 is a flow diagram of an embodiment for the status management method of the signalling service device.

First, in case that receives the status alteration information of the speech path device from the TDSH 18 during the operation (100), it is analyzed into each alteration states, that is, mounting, dismounting, blocking, unblocking, etc. (110), and a count for each status is altered (120).

Next, the kind of the status altered device is looked up (130), and at this time, in case that it is subscriber line, the first and the second DTMFR (DTMF Receiver) service reference values are calculated with reference to the number of the subscriber lines being performing the normal service (140), the first and the second DTMFR service reference values are looked up (160), and if altered, the first and the second DTMFR service reference values are altered and a fault segregating limitations value is reported (170).

Here, the fault segregating limitation value is calculated by using subscriber line reference load B(0.21 Erl) for DTMF reference traffic requested according to the number of subscribers mounted within each module, and it indicates the service limitation value of DTMFR corresponding to the generation reference value of the general alarm and the major alarm as based on 0.03 blocking probability.

In case that HVm(Ns) and LVm(Ns) indicate service limitation values for the number of subscribers (Ns) of the general alarm and the major alarm of each DTMFR, and are obtained by the following equation.

HVm(Ns) = the number of channels corresponding to 0.01 blocking probability of traffic TRm(Ns)

LVm(Ns) = the number of channels corresponding to 0.03 blocking probability of traffic TRm(Ns)

TRm(Ns) = (the number of subscribers) × (subscriber line reference load B) × (local traffic ratio) × (DTMF average holding time)/(local traffic average holding time) + (the number of subscribers) × (subscriber line reference load B) × (remote office traffic ratio) × (DTMF average holding time)/(remote office traffic average holding time)

After calculating and handling the first and the second DTMF service reference values, a next step calculates the first and the second ANM(ANnounceMent) service reference values (180), looks up the values (190), and if altered, alter the first and the second service reference values (200) and report a fault segregating limitation value (210).

Here, the fault segregating limitation value is calculated by using terminating traffic (0.1 Erl) per subscriber for reference traffic according to service type, and indicates the service limitation value according to ANM corresponding to the generation reference value of the general alarm and the major alarm as based on 0.01 and 0.03 blocking probability.

In said step, the ANM indicates the recording announcement device.

The service limitation functions HVaf(Ns) and LVaf(Ns) of the fixed ANM are obtained without respect to the number of subscribers since the time slot for each message is 16.

The service limitation functions HVam(Ns) and LVam (Ns) are obtained by the following equation.

HVam(Ns) = the number of channels corresponding to 0.01 blocking probability of traffic TRam(Ns)

LVam(Ns) = the number of channels corresponding to 0.03 blocking probability of traffic TRam(Ns)

TRam(Ns) = transfer anouncement service traffic TRam 1(Ns) + "Centrex" number alteration service traffic TRam 2(Ns) + "Do not disturb" service traffic TRam 3(Ns)

Traml(Ns) = (the number of subscribers) × (transfer anouncement service registration ratio) × (terminating traffic per subscriber)/(terminating average calling time) × (service ratio to terminating call) × (average holding time per outputting message)

Tram2(Ns) = ("centrex" subscriber number) × (number change ratio for a month) × (registration ratio) × (registration term) × (terminating traffic per subscriber)/(terminating average calling time per subscriber) × (average holding time per outputting message)

Tram3(Ns) = (the number of subscriber) × (service registration request ratio) × (terminating traffic per subscriber)/(terminating average calling time per subscriber) × (service ratio to terminating call) × (average holding time per outputting message)

The service limitation value function HVar(Ns) and LVar(Ns) of the ANM are obtained by the following equation.

HVar(Ns) = the number of channels corresponding to 0.1 blocking probability of traffic TRar(Ns) + the number of public service channels LVar(Ns) = the number of channels corresponding to 0.3 blocking probability of traffic TRar(Ns) + the number of public service channels TRar(Ns) = automatic receiving service traffic TRar 1(Ns) + advertising call service traffic TRar 2(Ns)

TRar 1(Ns) = (the number of subscribers) + (service registration request ratio) × (terminating traffic per subscriber)/(terminating average calling time per subscriber) × (service ratio to terminating call) × (average holding time per outputting message)

TRar 2(Ns) = (the number of subscribers) × (service registration request ratio) × (terminating traffic per subscriber)/(terminating average calling time per subscriber) × (service ratio to terminating call) × (average holding time per outputting message)

After calculating and handling the first and the second ANM service reference values (220), a next step calculates the service reference values of the first and the second conference call mixers (herein after referred to as "CMX") (220), look up the values, and if altered, it alters the first and the second CMX service reference values (240), and reports a fault segregating limitation value.

Said fault segregating limitation value is calculated as based on 0.01 and 0.03 blocking probabilities and subscriber traffic (0.2 Erl) for service limitation value of the CMX requested according to the number of subscribers mounted within the system.

The service limitation value functions HVc(Ns) and LVc(Ns) of the CMX are obtained by the following equation.

HVc(Ns) = 3 × the number of channels corresponding to 0.1 blocking probability of traffic TRc(Ns) (in case of three persons conference call)

LVc(Ns) = 3 × the number of channels corresponding to 0.3 blocking probability of traffic TRc(Ns) (in case of three persons conference call)

TRc(Ns) = three persons call service traffic TRc 1(Ns) + three persons conference call service traffic TRc 2(Ns) + four through six conference call service traffic TRc 3(Ns)

TRc 1(Ns) = (the number of three persons call average registration subscribers) × (subscriber traffic)/(terminating average calling time per subscriber) × (service ratio to terminating call) × (call average holding time)

TRc 2(Ns) = (the number of conference call average registration subscribers) × (subscriber traffic)/(terminating average calling time) × (conference call ratio) × (three persons call average holding time) × (ratio of three persons call to conference call)

TRc 3(Ns) = (the number of conference call average registration subscribers) × (subscriber traffic)/(terminating average calling time) × (conference call ratio) × (three persons call average holding time) × (ratio of four through six persons call to conference call)

In case of calculating and handling the first and the second service reference value (150 through 250) and in case that the status alternation device is DTMFR, ANM and CMX in the kind and search of the status alteration device (130), a next step analyzies the service status for each device (260), compares the service status and the first service reference number (270), and in case that said service status is more than the first service reference value, it is ended. At this time, in case that the service status is below the first reference value, it compares again the service status and the second service reference value (280), and if the service status is more than the second service reference value, alters the software alarm status (310), outputs the software general alarm, and requests the device segregating holdback to the TDSH. At this time if the service status is below the second service reference value, it alters the alarm status of software, outputs the major alarm of software, and requests the device segregating holdback to the TDSH. At this time, if said service status is below the second service reference value, it alters software alarm status (290), outputs software major alarm (300), and requests device segregating holdback to the TDSH.

Figure 4:
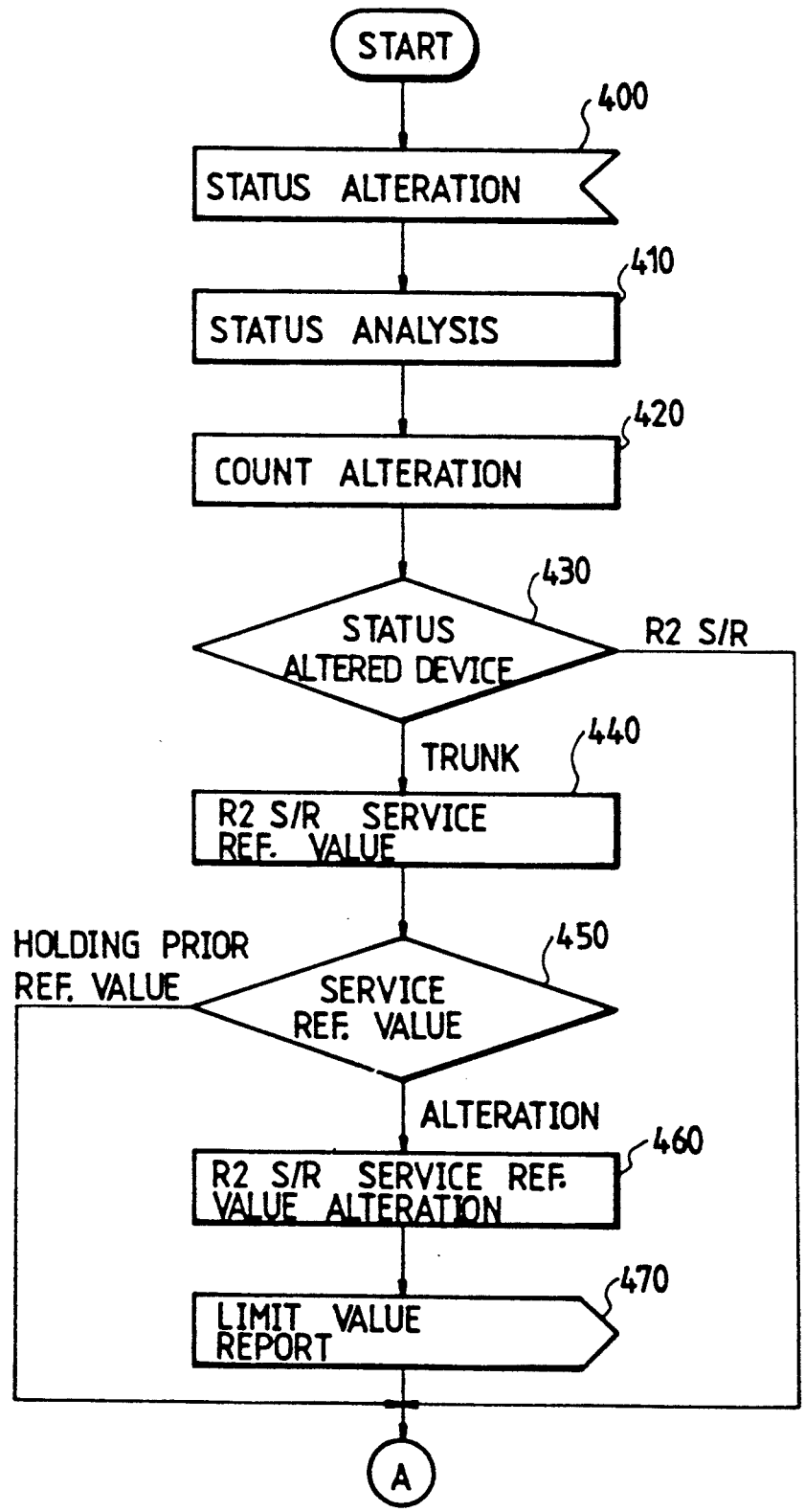
FIG. 4 is a flow diagram of another embodiment of a status management method.

FIG. 4 is a flow diagram of showing another embodiment of this invention.

In case that receives the status alteration information of the speech path device from the TDSH 18 during the operation (400), the first step analyzes that information into each alteration status, that is, mounting, dismounting, blocking, unblocking, etc. (410), and alters a count for each status (420).

The second step searches the status altered device (430). In this search, in case of trunk, it calculates the first and the second R2 S/R (Sender/Receiver) service reference values as based on normal trunk (440), searches that reference values (450), and if altered, it alters that reference values (460) and reports a fault segregating limitation value (470). Here, the fault segregating limitation value is calculated by using trunk reference load A (0.7 Erl) for R2 reference traffic requested according to the number of trunks mounted within each module under the status of operation, and it indicates R2 service limitation value corresponding to the reference value of each general alarm and major alarm as based on 0.01 and 0.03 blocking probabilities.

HVr(Nz) and LVr(Nt) are service limitation value functions for the number of trunks Nt of each R2 general alarm level and major alarm level, and are obtained by the following equation.

HVr(Nt) = the number of channels corresponding to 0.1 blocking probability of traffic TRr(Nt)

LVr(Nt) = the number of channels corresponding to 0.3 blocking probability of traffic TRr(Nt)

TRr(Nt) = (the number of trunks) × (trunk reference load A) × (R2 sender average holding time)/(outgoing call average holding time)

In case that said status altered device is R2 S/R (430) and R2 S/R service reference value holds prior reference value, the third step analyzes the first and the second R2 S/R service status (480), compares said service status to the first service reference value (490), and if said service status is more than the first service reference value, it is ended. At this time if said service status is below the first service reference value, it compares again said service status to the second service reference value (500).

At this time, if said service status is more than the second service reference value, it alters software alarm status (530), outputs software general alarm (540), and requests R2 service segregating holdback to the TDSH. And if said service status is below the second service reference value, it alters software alarm status (510), outputs software major alarm (520), and requests R2 service segregating holdback.

What is claimed is:

1. In an electric switching system comprising a plurality of processors performing operation and maintenance, signalling service interface and control functions for performing status management of a plurality of signalling service devices, a status management method comprising:

a first step of receiving a status alteration information of speech path device, analyzing each alteration status, and altering a count for each status;

a second step of calculating a service reference value of each signalling service device as based on the number of subscriber lines for normal service in case that a status alteration device is subscriber line, and reporting a fault segregating limitation value of each signalling service device in case that said service reference value is altered; and a third step of analyzing a service status of each signalling service device according to said service reference value, and ending the status management or outputting a software alarm according to an analysis result of said service status.

2. In an electric switching system comprising a plurality of processors performing operation and maintenance, signalling service interface and control functions for performing status management of a plurality of signalling service devices, a status management method comprising:

a first step of receiving a status alteration information of speech path device, analyzing each alteration status and altering a count for each status;

a second step of calculating a R2 service reference value as based on trunk for normal service in case that a status alteration device is trunk, and reporting a fault segregating limitation value of R2 sender/receiver device in case that said R2 service reference value is altered; and a third step of analyzing a service status of said R2 sender/receiver device according to said R2 service reference value, and ending the status management or outputting a software alarm according to an analysis result of said service status.

3. A status management method according to claim 2, wherein said third step comprising a fourth step of outputting a general alarm in case that said service status is below a first service reference value and more than a second service reference value, and a fifth step of outputting a major alarm in case that said service status is below the second service reference value.

* * * * *